UNITED STATES PATENT OFFICE.

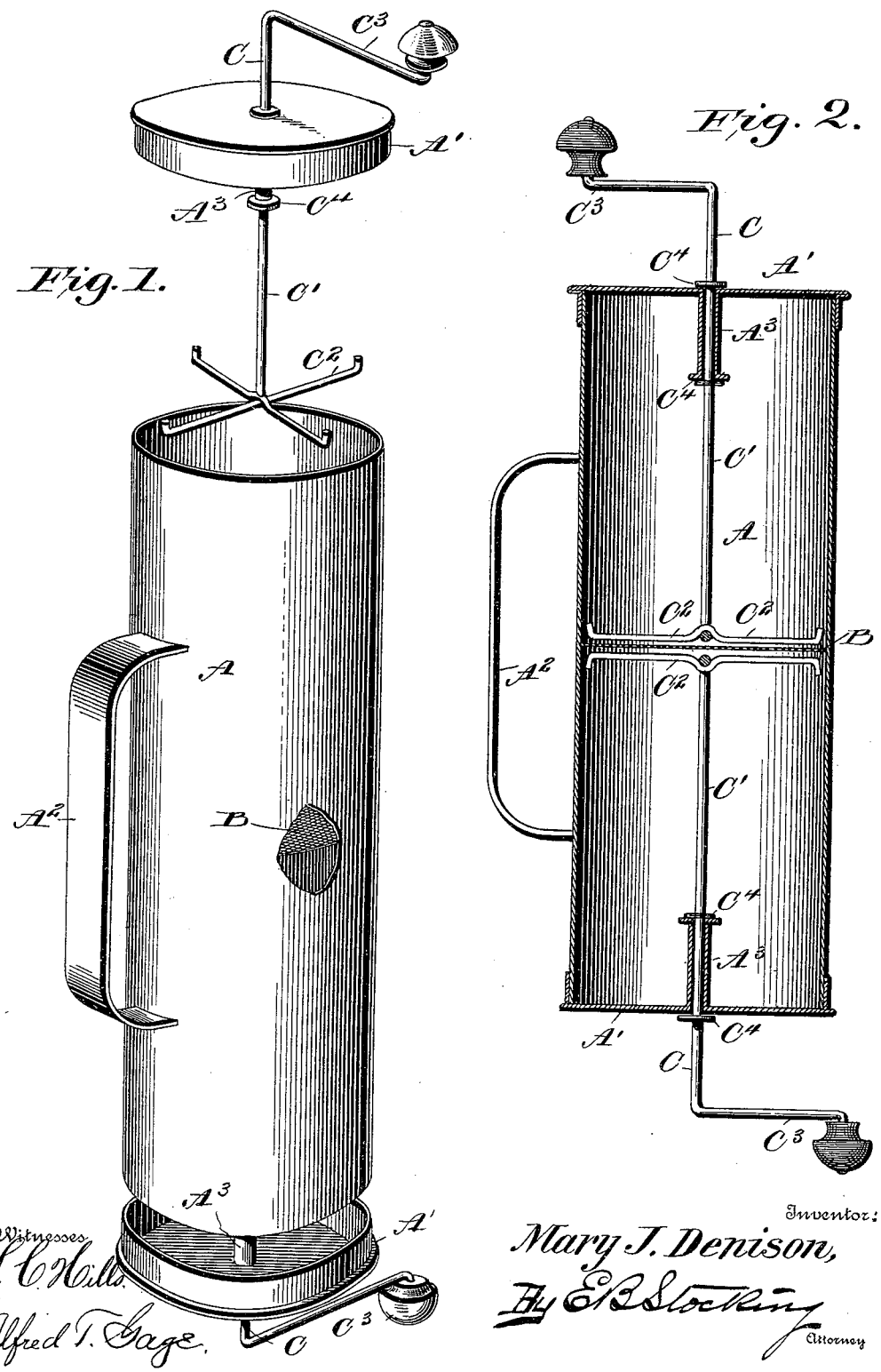

MARY J. DENISON, OF SHAUCK'S, OHIO.

FLOUR-SIFTER.

SPECIFICATION forming part of Letters Patent No. 619,872, dated February 21, 1899.

Application filed December 31, 1897. Serial No. 664,803. (No model.)

*To all whom it may concern:*

Be it known that I, MARY J. DENISON, a citizen of the United States, residing at Shauck's, in the county of Morrow, State of Ohio, have invented certain new and useful Improvements in Flour-Sifters, of which the following is a specification, reference being had therein to the accompanying drawings.

This invention relates to flour-sifters, and particularly to a sifter adapted to successively sift the flour or other material a number of times, so as to leaven or lighten the flour.

Heretofore it has been the custom in cake-making or other cooking to pass the flour a number of times through a sieve in order to thoroughly separate the particles thereof, and thus lighten the flour, so as to improve the quality of the dough to be subsequently baked.

This invention has for its object to provide a sifter in which the successive siftings of the flour may be performed without the removal of the flour from the sifter by simply reversing the casing and operating a stirrer at the uppermost end.

A further object of the invention is to improve the construction of the stirrer, so that the same is held against lateral movement and against longitudinal movement in relation to the sieve.

Other objects and advantages of the invention will hereinafter appear in the following description, and the novel features thereof will be particularly pointed out in the appended claims.

In the drawings, Figure 1 is a perspective of the invention with the parts separated, and Fig. 2 is a vertical cross-section through the sifter with the parts in position for use.

Like letters of reference indicate like parts throughout both figures of the drawings.

The letter A designates a casing which may be cylindrical in form, as illustrated, or of any other configuration. It is provided at opposite ends with removable covers A', and substantially midway of its length with a handle $A^2$. Centrally within the casing A there is located a transverse sieve B, which may be formed of any suitable material, preferably of fine-wire gauze, which is usually used for sifting flour and similar material.

From the foregoing it will be seen that the casing of the sifter is divided into two compartments separated by a sieve, so that the flour in either of the compartments will be sifted into the one beneath the same and upon a reversal of the sifter the operation repeated and the flour entering the first compartment. The sifting operation may be successively continued for any desired length of time in order to properly lighten the flour or other material being operated upon.

It is obvious that in order to pass the flour through the sieve it will be necessary to agitate the flour, and for this purpose a stirrer C has been provided, which consists of a shaft or stem C', having arms $C^2$ at the lower end thereof, which extend at right angles to the shaft C'. These arms may be of any desired shape and arrangement and are slightly upturned at their outer ends in order to prevent contact with or injury to the sieve or casing. The upper end of the stirrer is formed with a suitable handle $C^3$ for the operation of the same, and the stirrer is centrally journaled within an elongated bearing $A^3$, extending inwardly from the cap A'. This bearing prevents any lateral movement of the stirrer, while the shaft C' of the stirrer is provided with suitable washers or disks $C^4$, above and below said bearing, to prevent vertical movement of the stirrer and hold the same in a predetermined relation to the sieve when the cap is placed upon the casing. The stirrers upon opposite ends of the casing are similar in construction, and therefore need not be independently described, as they perform the same functions in their relation to the single central sieve B.

In the operation of the device the flour will be placed in one of the compartments above the sieve B, the stirrer and cap placed in position on the casing, and the former rotated to agitate the flour and facilitate the passage of the same through the sieve B. The flour thus passes to the compartment at the opposite end of the casing and lies around and in contact with the stirrer in the compartment at that end. The casing is then simply reversed by the handle $A^2$, so that the opposite compartment becomes uppermost and the flour again sifted back into the compartment from which the operation began. A number of successive siftings are usually necessary to properly leaven or lighten the flour, as the more thoroughly the flour is sifted before use the finer will be the particles, and will thus produce a better quality of cake or other food which is formed from the sifted flour.

It may be here stated that the object of this invention is not to remove foreign particles from the flour, but to produce a device for successively sifting the flour a number of times without the necessity of removing the flour from the sifter or the liability of spilling or scattering the flour during the operation.

It is obvious that changes may be made in the details of construction and configuration of the parts of the sifter without departing from the spirit of the invention as defined by the appended claims.

Having described my invention and set forth its merits, what I claim as new, and desire to secure by Letters Patent, is—

1. A flour-sifter comprising a casing, a transverse centrally-disposed screening-partition, removable closures at opposite ends of said casing, and stirrers located at opposite sides of said screen; substantially as specified.

2. A flour-sifter comprising a casing provided with a centrally-disposed handle, a transverse sieve located substantially midway between the ends of said casing, caps removably fitted upon the opposite ends of said casing, and stirrers journaled in said caps and lying upon opposite sides of said sieve; substantially as specified.

3. A flour-sifter comprising a casing provided with a handle, a transverse centrally-disposed sieve within said casing, removable caps upon opposite ends of said casing provided with inwardly-extended elongated bearings, stirrers located upon opposite sides of said sieve and journaled in the bearings in said caps, and means for preventing the longitudinal movement of the stirrers; substantially as specified.

In testimony whereof I affix my signature in presence of two witnesses.

MARY J. DENISON.

Witnesses:
C. MARSHALL HOSLER,
GEO. R. HOSLER.